United States Patent [19]

Hasegawa

[11] Patent Number: 4,509,485
[45] Date of Patent: Apr. 9, 1985

[54] METHOD AND DEVICE FOR BACK PRESSURE-DEPENDENT CORRECTION OF AIR/FUEL RATIO FOR INTERNAL COMBUSTION ENGINES

[75] Inventor: Shumpei Hasegawa, Niiza, Japan

[73] Assignee: Honda Giken Kogyo Kabushiki Kaisha, Tokyo, Japan

[21] Appl. No.: 442,505

[22] Filed: Nov. 17, 1982

[30] Foreign Application Priority Data

Nov. 18, 1981 [JP] Japan .............................. 56-184985

[51] Int. Cl.³ .............................................. F02B 3/00
[52] U.S. Cl. ................................... 123/440; 123/489; 123/494
[58] Field of Search ......................... 123/440, 489, 494

[56] References Cited

U.S. PATENT DOCUMENTS 4,200,064 4/1980 Engele ................................ 123/480
4,235,204 11/1980 Rice ................................... 123/489
4,269,156 5/1981 Drellishak ......................... 123/440

Primary Examiner—Ronald B. Cox
Attorney, Agent, or Firm—Lyon & Lyon

[57] ABSTRACT

A method comprising correcting the air/fuel ratio of a mixture being supplied to an internal combustion engine, by the use of a correction coefficient determined as a function of detected values of atmospheric absolute pressure and intake pipe absolute pressure. A device is also provided, which includes means for arithmetically calculating the correction coefficient as a function of outputs of sensors for sensing the two kinds of absolute pressure or means storing predetermined values of the correction coefficient for selective reading as a function of the sensor outputs, and means for correcting the valve opening period of a fuel injection valve by the calculated or read coefficient value.

7 Claims, 11 Drawing Figures

RESIDUAL GAS
BEFORE OPENING OF SUCTION VALVE (AT POINT 5 IN FIG.1)

$P_r, T_r, G_r$
$V_0/\varepsilon$

ADIABATIC EXPANSION →

RESIDUAL GAS
AFTER OPENING OF SUCTION VALVE (AT POINT 6 IN FIG.1)

$P_B, T_r'\ G_r$
$V_r$

FRESH AIR
(AT POINT 6 IN FIG.1)

$P_B, T_B, G_a$
$V_a$

MIXING →

MIXTURE AFTER SUCTION
(AT POINT 0 IN FIG.1)

$P_B, T_0, G_0$
$V_0$

| PR \ PB | PB9 | PB10 | ------ | PBj | ------ | PB16 |
|---|---|---|---|---|---|---|
| PR1 | KPr1·9 | KPr1·10 | | | | |
| PR2 | KPr2·9 | KPr2·10 | | | | |
| ⋮ | | | | | | |
| PRi | | | | KPrij | | |
| ⋮ | | | | | | |
| PR8 | | | | | | KPr8·16 |

METHOD AND DEVICE FOR BACK PRESSURE-DEPENDENT CORRECTION OF AIR/FUEL RATIO FOR INTERNAL COMBUSTION ENGINES

BACKGROUND OF THE INVENTION

This invention relates to back pressure-dependent correction of the air/fuel ratio of a mixture being supplied to an internal combustion engine, and a device for practicing the same method.

A fuel supply control system adapted for use with an internal combustion engine, particularly a gasoline engine has been proposed e.g. by U.S. Pat. No. 3,483,851, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

The quantity of air being sucked into engine cylinders can vary with changes in the pressure in the exhaust pipe of the engine, that is, the back pressure, even when other factors for the operating condition of the engine remain unchanged. Therefore, it is desirable to correct the quantity of fuel being supplied to the engine in dependence upon changes in the back pressure in order to achieve an optimum air/fuel ratio.

A change in the back pressure can be caused by a change in atmospheric pressure, which is particularly conspicuous during engine operation at a high altitude. Besides the atmospheric pressure, in an engine equipped with a turbocharger or a like device in particular, the back pressure can largely vary according to changes in the operating condition of the engine. A further factor for the change of the back pressure is a change in the performance of the turbocharger or the like device.

In a conventional fuel supply control system of the above-mentioned kind, it is generally employed to correct the fuel supply quantity for the engine in response to changes in the atmospheric pressure or changes in the exhaust pipe pressure so as to obtain an air/fuel ratio suitable for the engine operation, for improvements in the fuel consumption, emission characteristics and driveability of the engine.

For instance, in a fuel supply control system adapted for correction of the basic valve opening period of a fuel injection valve by means of a correction coefficient as mentioned above, an atmospheric pressure-dependent correction coefficient or a back pressure-dependent correction coefficient is provided as one of the aforementioned correction coefficients, for correction of the air/fuel ratio of the mixture.

However, according to such conventional back pressure-dependent correction of the air/fuel ratio which is determined by intake pipe absolute pressure as noted above, the air/fuel ratio is corrected in dependence upon either the atmospheric pressure or the back pressure alone. That is, the correction amount is not based upon the actual operating condition of the engine per se, making it difficult to perform the air/fuel ratio correction in a perfect manner.

OBJECT AND SUMMARY OF THE INVENTION

It is the object of the invention to provide a method and a device for back pressure-dependent air/fuel ratio correction, which is adapted to correct the air/fuel ratio of a mixture being supplied to an internal combustion engine, in dependence upon not only back pressure or exhaust pipe absolute pressure but also intake pipe absolute pressure, so as to always control the air/fuel ratio to an optimum value irrespective of changes in the back pressure, attributed to changes in the atmospheric pressure, the operating condition of the engine, and/or the performance of the turbocharger, etc. to thereby improve the fuel consumption, emission characteristics and driveability of the engine.

The present invention is based upon the recognition that the quantity of air sucked into the engine cylinders is variable as a function of intake pipe absolute pressure as well as exhaust pipe absolute pressure.

The invention provides an air/fuel ratio correcting method which comprises detecting absolute pressure in an exhaust pipe of an internal combustion engine and also the absolute pressure in an intake pipe of the engine at a location downstream of a throttle valve in the same pipe, determining the value of a correction coefficient as a function of the detected absolute pressure values, and correcting the air/fuel ratio of an air/fuel mixture being supplied to the engine, which has been determined as a function of the operating condition of the engine, by an amount corresponding to the correction coefficient value determined above.

Further, the invention provides an air/fuel ratio correcting device which comprises a first pressure sensor for detecting the absolute pressure in the exhaust pipe, a second pressure sensor for detecting the absolute pressure in the intake pipe, means for arithmetically calculating the value of the correction coefficient as a function of outputs of the first and second pressure sensors, and means for correcting the valve opening period of an electromagnetically operated fuel injection valve, which has been determined as a function of the operating condition of the engine, by an amount corresponding to the correction coefficient value calculated above.

Alternatively of the above arithmetically calculating means, the air/fuel ratio correcting device according to the invention may include means storing a plurality of predetermined values of the correction coefficient which are given as a function of the absolute pressure in the exhaust pipe and the absolute pressure in the intake pipe, and means responsive to outputs of the first and second pressure sensors for selectively reading a corresponding one of the predetermined coefficient values from the above storage means.

The above and other objects, features and advantages of the invention will be more apparent from the ensuing detailed description taken in connection with the accompanying drawings.

DETAILED DESCRIPTION

The present invention will now be described in detail with reference to the drawings.

Figures 1, 2:
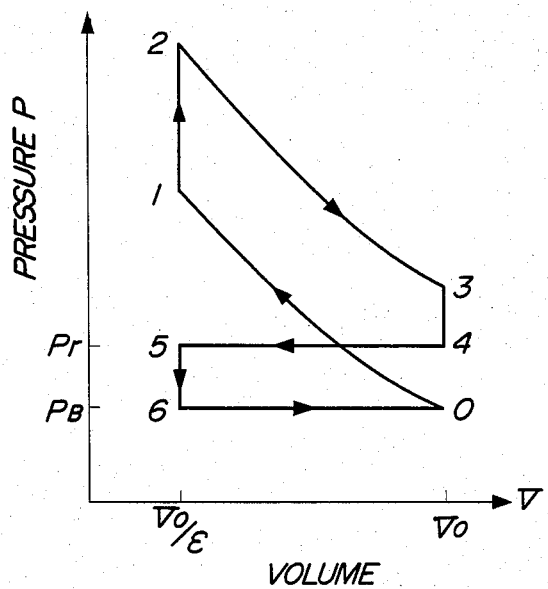
FIG. 1 is a pressure volume diagram of an Otto cycle engine.
FIG. 2 is a view illustrating quantities of state of residual exhaust gas, fresh air, and a mixture thereof available, respectively, at state points 5, 6 and 0 in FIG. 1.

FIG. 1 is a pressure volume diagram of an Otto cycle engine. 0→1 designates an adiabatic compression step, 1→2 an isochoric combustion step, 2→3 an adiabatic expansion step, and 3→4→5 an exhaust step, respectively. According to the diagram, when the exhaust valve is closed and simultaneously the intake valve is opened at state point 5, the pressure in the engine cylinder instantaneously drops from a value corresponding to exhaust pipe pressure Pr to a value corresponding to intake pipe pressure PB (step 5→6). In the diagram, 6→0 designates a suction step where the piston is moved from its top dead center to its bottom dead center.

It will now be explained how the suction gas amount Ga is determined during the step 5→6→0 where fresh air is sucked into the engine cylinder. In the explanation, let it be assumed that first, during the step 5→6 the residual gas in the engine cylinder is adiabatically expanded back into the intake pipe, while simultaneously reducing its own pressure from a value corresponding to pressure Pr to a value corresponding to pressure PB, and during the following step 6→0, the flowing-back residual gas and fresh air are sucked into the cylinder, while simultaneously exchanging heat with each other. Further, the heat exchange between the cylinder wall and the intake pipe wall, and the residual gas and fresh air is not taken into account in the assumption. Let it be also assumed as a second assumption that the residual gas and fresh air behave as ideal fluid and assume identical values with each other with respect to gas constant Ra, specific heat at constant pressure Cp, specific heat at constant volume Cv, and ratio of specific heat χ.

FIG. 2 shows the quantities of state of the residual gas, the fresh air and a mixture thereof, respectively, at state points 5, 6 and 0. The relationships between these quantities of state can be represented by the following equations. Symbols used in the equations are interpreted as follows:

P = pressure (Kg/cm²abs.),
T = temperature (°K.),
G = quantity of air (Kg),
V = volume (m³),
ε = compression ratio of the engine,
χ = ratio of specific heat of air,
C = Vo/Ro, which is constant,
r,r' = as of residual gas,
B = as in the intake pipe,
a = as of fresh air, and
o = as at state point 0 in FIG. 1

According to the above second assumption that all the gases have the same value Cv and to the principle of conservation of energy, $$Go \cdot Cv \cdot To = Gr \cdot Cv \cdot Tr' + Ga \cdot Cv \cdot TB \quad (1)$$

According to the equation of adiabatic change, $$Tr' = Tr(PB/Pr)^{(\chi-1)/\chi} \quad (2)$$

$$Vr = (Vo/\epsilon) \times (Pr/PB)^{1/\chi} \quad (3)$$

According to the equation of state, $$Pr \cdot Vo/\epsilon = Gr \cdot Ra \cdot Tr \quad (4)$$

$$PB \cdot Vr = Gr \cdot Ra \cdot Tr' \quad (5)$$

$$PB \cdot Va = Ga \cdot Ra \cdot TB \quad (6)$$

$$PB \cdot Vo = Go \cdot Ra \cdot To \quad (7)$$

From the equations (1), (5) and (6), $$PB(Vr + Va) = Ra \cdot Go \cdot To \quad (8)$$

If the equation (7) is substituted into the equation (8), $$Vr + Va = Vo \quad (9)$$

The equation (9) shows that the mixture does not change in volume so long as its own pressure is constant.

If the equations (3) and (6) are applied to the equation (9), $$Ga = C \cdot PB/TB\{1 - (1/\epsilon)(Pr/PB)^{1/\chi}\} \quad (10)$$

The equation (10) forms the basic principle of the present invention, showing that the quantity of suction air Ga is given as a function of intake pipe pressure PB, intake pipe temperature TB, and exhaust pipe pressure Pr.

The air/fuel ratio correction according to the invention is effected on the basis of a reference value Pro of back pressure which is available in an exhaust pipe of an engine which is not provided with any element which increases the back pressure, such as a turbocharger, at a certain value of atmospheric pressure, e.g. standard atmospheric pressure (760 mmHg). As an example, the reference back pressure value is set at a value nearly equal to standard atmospheric pressure, e.g. 770 mmHg, when the engine is operating under standard atmospheric pressure. If a quantity of air and a quantity of fuel which have to be supplied to the engine at the above reference back pressure in order to obtain a required air/fuel ratio, e.g. a theoretical air/fuel ratio, are designated, respectively, by Gao and Gfo, the following relationship has to be satisfied to make the actual air/fuel ratio Ga/Gf (Gf=fuel quantity) equal to an air/fuel ratio Gao/Gfo at the reference back pressure Pro:

$$Ga/Gf = Gao/Gfo \quad (11),$$

in the event that there occurs a change in the actual back pressure Pr due to a change in the atmospheric pressure and/or the action of the turbocharger or the like device at the step 3→4→5 in FIG. 1. Therefore, a quantity of fuel has to be supplied to the engine, which is determined by the following equation:

$$Gf = Gfo \times Ga/Gao = Gfo \times \frac{\{1 - (1/\epsilon)(Pr/PB)^{1/x}\}}{\{1 - (1/\epsilon)(Pro/PB)^{1/x}\}} \quad (12)$$

provided that TB remains constant. Therefore, from the equation (12), the following equations can be reached:

$$Gf = KPR \times Gfo \quad (13)$$

$$KPR = \frac{1 - (1/\epsilon)(Pr/PB)^{1/x}}{1 - (1/\epsilon)(Pro/PB)^{1/x}} \quad (14)$$

where KPR designates a back pressure-dependent correction coefficient, hereinlater referred to.

As is learned from the above, the value of the correction coefficient KPR can be determined as a function of back pressure Pr and intake pipe absolute pressure PB. According to the equation (14), the coefficient KPR has a value larger than 1 when the actual back pressure PA is smaller than the reference back pressure Pro. This means that the mixture becomes leaner when the back pressure Pr drops below the reference value Pro due to a change in the atmospheric pressure, at a high altitude, etc., unless back pressure-dependent correction of the air/fuel ratio is effected. On the other hand, in an engine equipped with a turbocharger or a like device, the back pressure Pr is above the reference value Pro during engine operation even under standard atmospheric pressure, for instance. On such occasion, the back pressure-dependent correction coefficient KPR has a value smaller than 1. This means that the mixture has a richer air/fuel ratio unless back pressure-dependent correction is effected, as contrary to the aforementioned case.

Embodiments of the invention for back pressure-dependent air/fuel ratio correction by means of the correction coefficient KPR will now be described with reference to FIGS. 3 through 11.

Figure 3:
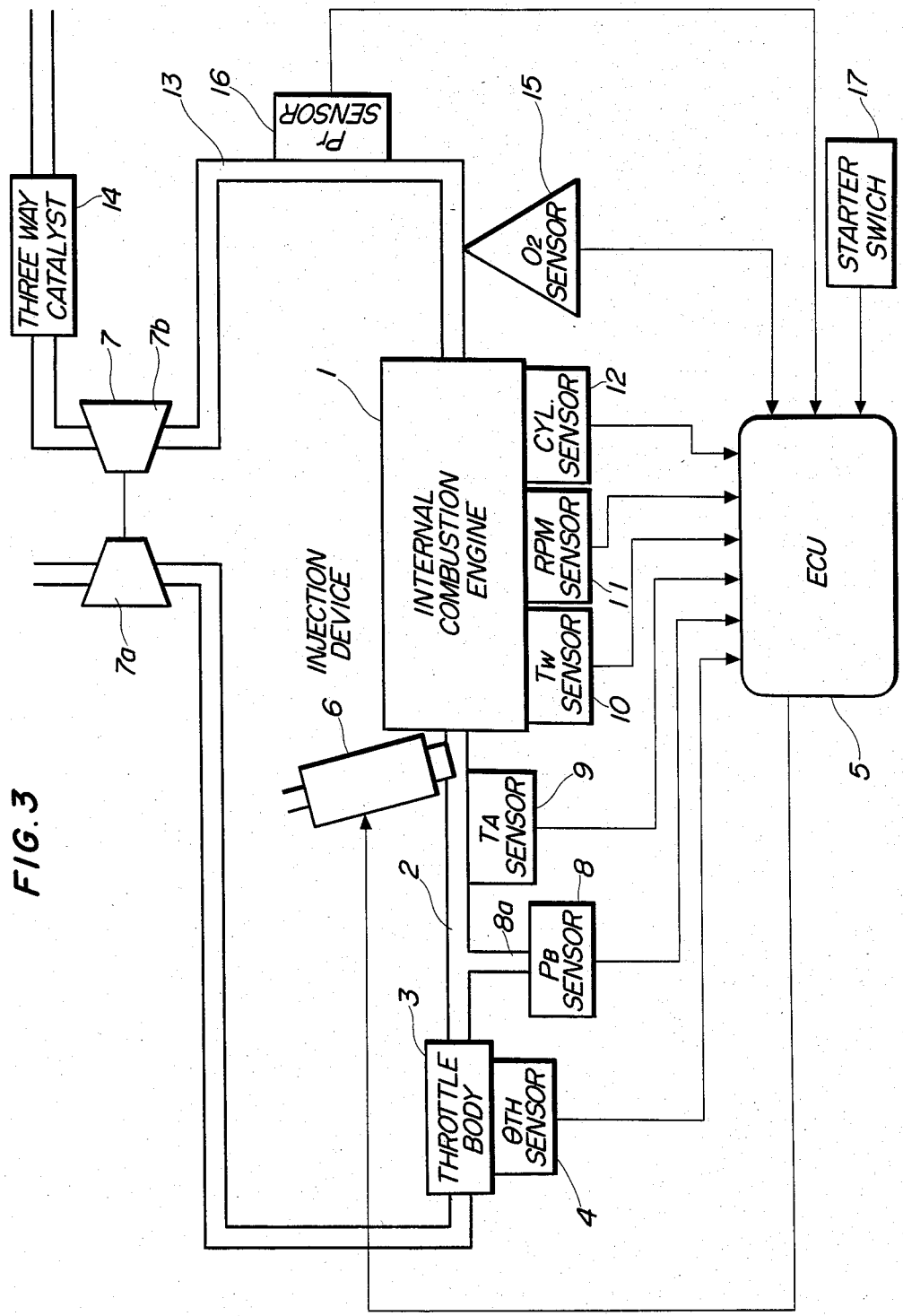
FIG. 3 is a block diagram illustrating the whole arrangement of a fuel supply control system to which the present invention is applicable.

Referring first to FIG. 3, there is illustrated the whole arrangement of a fuel injection control system for internal combustion engines, to which the present invention is applied. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 are an impeller 7a of a turbocharger 7 at an upstream location and a throttle body 3 at a downstream location. The throttle body 3 accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, all formed by electromagnetically operated fuel injection valves, none of which is shown. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods or fuel injection quantities controlled by driving signals supplied from the ECU 5.

On the other hand, an absolute pressure sensor 8 communicates through a conduit 8a with the interior of the main intake pipe of the throttle body 3 at a location immediately downstream of the main throttle valve. The absolute pressure sensor 8 is adapted to detect absolute pressure in the intake pipe 2 and applies an electrical signal indicative of detected absolute pressure to the ECU 5. An intake air temperature sensor 9 is arranged in the intake pipe 2 at a location downstream of the absolute pressure sensor 8 and also electrically connected to the ECU 5 for supplying thereto an electrical signal indicative of detected intake air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

Arranged across the exhaust pipe 3 of the engine 1 are a turbine wheel 7b of the turbocharger 7 at an upstream location and a three-way catalyst 14 at a downstream location. The turbine wheel 7b of the turbocharger 7 is arranged to be rotatively driven by exhaust gases emitted from the engine 1, so that the impeller 7a arranged across the intake pipe 2 and coupled to the turbine wheel 7b for rotation in unison therewith supercharges air to the engine 1. The three-way catalyst 14 acts to purify ingredients HC, CO and NOx contained on the exhaust gases. An O₂ sensor 15 is inserted in the exhaust pipe 13 at a location upstream of the turbine wheel 7b of the turbocharger 7 for detecting the concentration of oxygen in the exhaust gases and supplying an electrical signal indicative of a detected concentration value to the ECU 5. A back pressure sensor 16 is also inserted in the exhaust pipe 13 at a location upstream of the turbine wheel 7b for detecting absolute pressure in the exhaust pipe 13, and supplying an electrical signal indicative of a detected pressure value to the ECU 5.

Further connected to the ECU 5 is a starting switch 17 of the engine for supplying an electrical signal indicative of its own on and off positions to the ECU 5.

Figure 4:
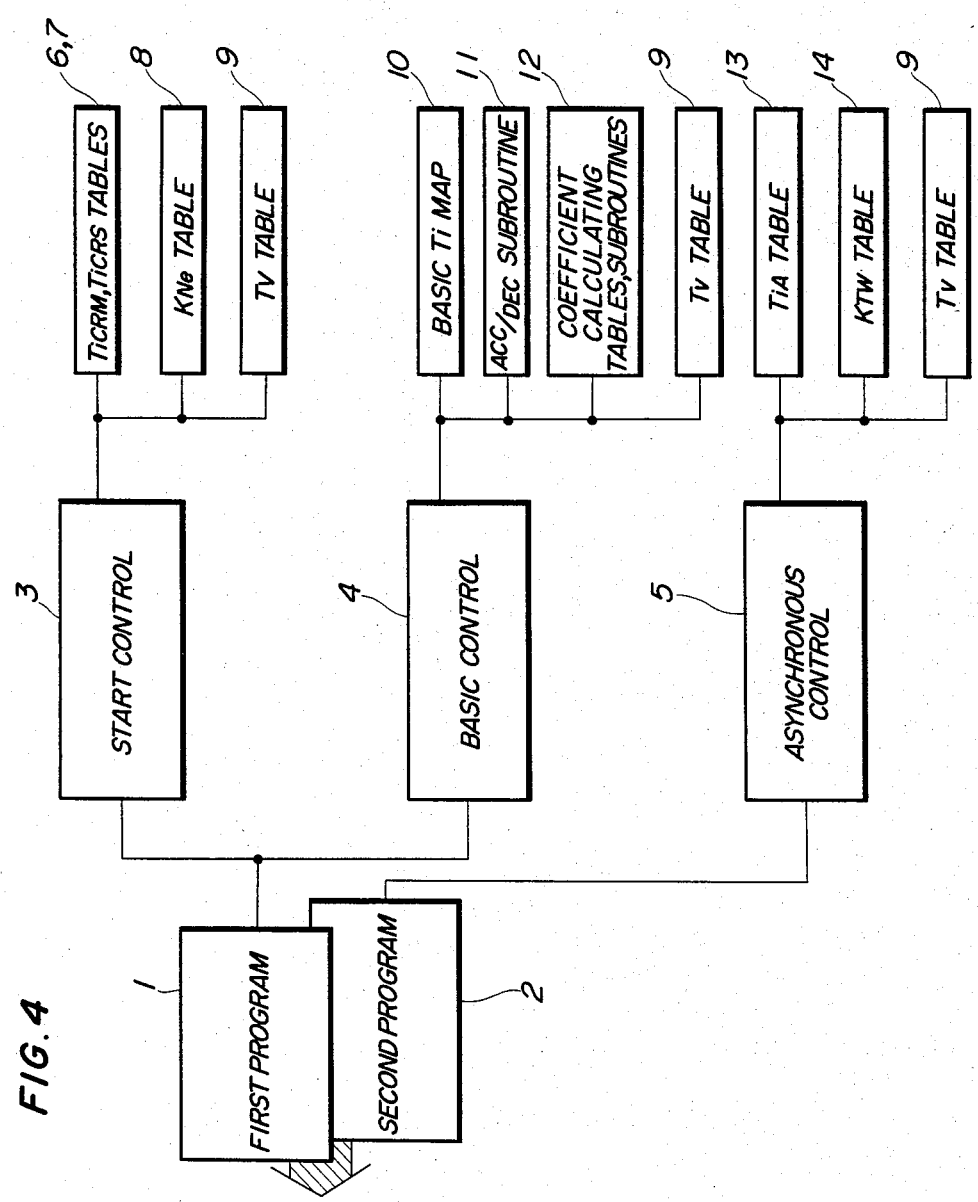
FIG. 4 is a block diagram illustrating a whole program for control of the valve opening periods TOUTM and TOUTS of the main injectors and the subinjector, which is incorporated in the electronic control unit (ECU) in FIG. 1.

FIG. 4 shows a block diagram showing the whole program for air/fuel ratio control, i.e., control of the valve opening periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (15)$$

$$TOUTS = TiCRS \times KNe + TV \quad (16)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery 18, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW \times KAFC \times KPR \times KAST \times KWOT \times KO_2 \times KLS) + TACC \times (KTA \times KTWT \times KAFC) + (TV + \Delta TV) \quad (17)$$

$$TOUTS = (TiS - TDEC) \times (KTA \times KTW \times KAST \times KPR) + TV \quad (18)$$

where TiM and TiS represent basic values of the valve opening periods for the main injectors and the subinjector, respectively, and are determined from a basic Ti map 10, and TDEC and TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPR an back pressure-dependent correction coefficient determined from a table as a function of actual exhaust pipe absolute pressure and actual intake pipe absolute pressure, and KAST a fuel increasing coefficient applicable after the start of the engine and determined by a subroutine. KWOT is a coefficient for enriching the air/fuel mixture, which is applicable at wide-open-throttle and has a constant value, KO2 an "O2 feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with the TDC signal is determined by the following equation:

$$TMA = TiA \times KTWT \times KAST + (TV + \Delta TV) \quad (19)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 5:
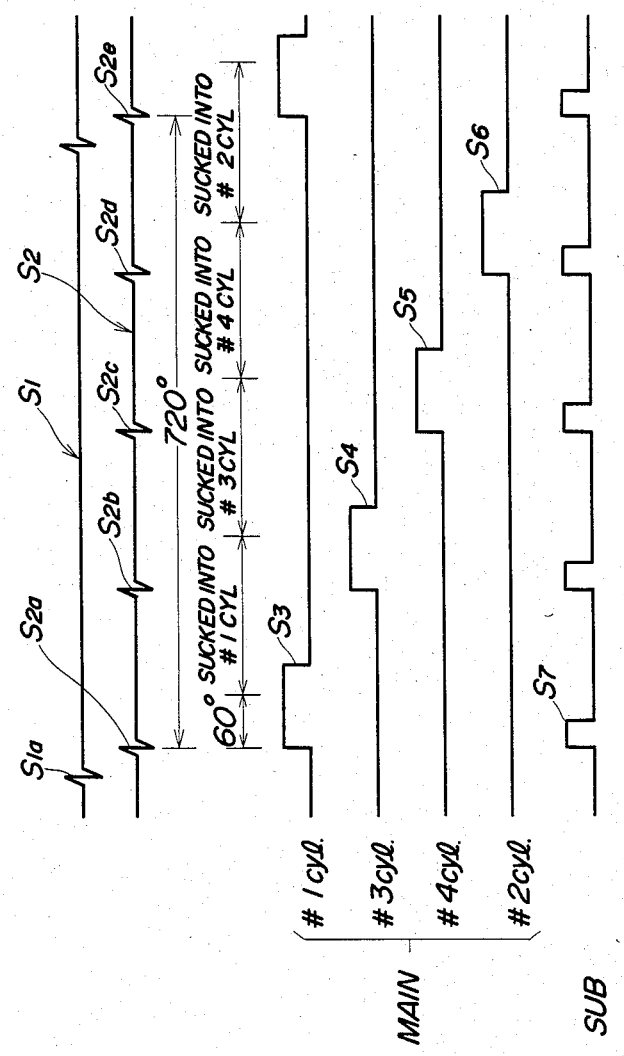
FIG. 5 is a timing chart showing the relationship between a cylinder-discriminating signal and a TDC signal inputted to the ECU, and driving signals for the main injectors and the subinjector, outputted from the ECU.

FIG. 5 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_{1a}$ each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse $S_{2b}$, the driving signal $S_5$ for the fourth cylinder concurrently with the third pulse $S_{2c}$, and the driving signal $S_6$ for the second cylinder concurrently with the fourth pulse $S_{2d}$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_{2a}$, $S_{2b}$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figure 6:
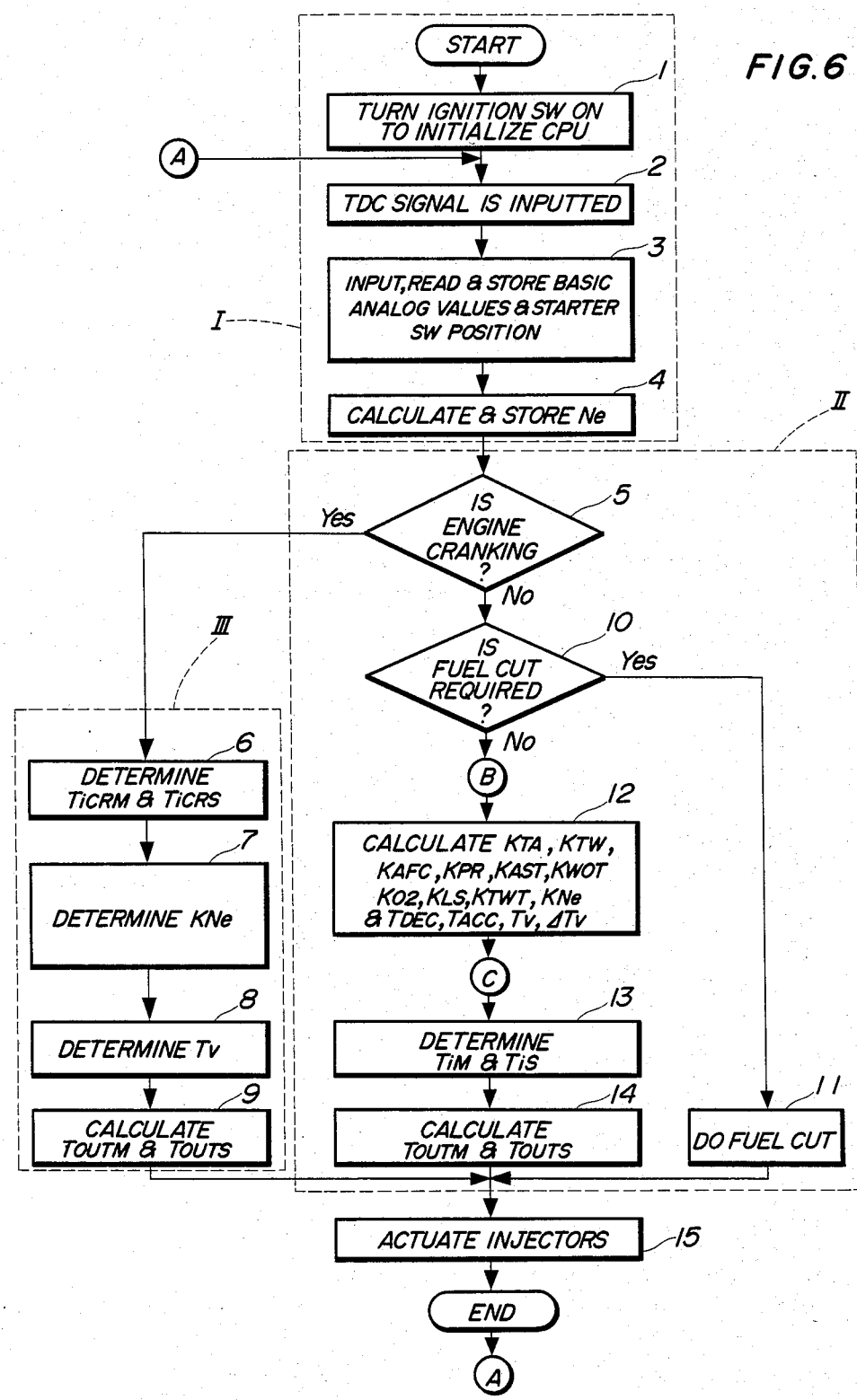
FIG. 6 is a flow chart showing a main program for control of the valve opening periods TOUTM and TOUTS.

Referring next to FIG. 6, there is shown a flow chart of the aforementioned first program 1 for control of the valve opening period in synchronism with the TDC signal in the ECU 5. The whole program comprises an input signal processing block I, a basic control block II and a start control block III. First in the input processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of back pressure Pr, absolute pressure PB, engine cooling water temperature TW, atmospheric air temperature TA, throttle valve opening $\theta$th, battery voltage V, output voltage value V of the $O_2$ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also the value of Ne-dependent correction coefficient KNe is determined by using the KNe table (step 7). Further, the value of battery voltage-dependent correction constant TV is determined by using the TV table (step 8). These determined values are applied to the aforementioned equations (15), (16) to calculate the values of TOUTM and TOUTS (step 9).

If the answer to the question of the above step 5 is no, it is determined whether or not the engine is in a condition for carrying out fuel cut, at the step 10. If the answer is yes, the values of TOUTM and TOUTS are both set to zero, at the step 11.

On the other hand, if the answer to the question of the step 10 is negative, calculations are carried out of values of correction coefficients KTA, KTW, KAFC, KPR, KAST, KWOT, $KO_2$, KLS, KTWT, etc. and values of correction constants TDEC, TACC, TV and $\Delta$TV, by means of the respective calculation subroutines and tables, at the step 12. The subroutine for determining the value of the correction coefficient KPR will be described hereinlater.

Then, basic valve opening period values TiM and TiS are selected from respective maps of the TiM value and the TiS value, which correspond to data of actual engine rpm Ne and actual absolute pressure PB and/or like parameters, at the step 13.

Then, calculations are carried out of the values TOUTM and TOUTS on the basis of the values of correction coefficients, correction constants and basic valve opening periods determined at the steps 12 and 13, as described above, using the aforementioned equations (17), (18) (step 14). The main injectors and the subinjector are actuated with valve opening periods corresponding to the values of TOUTM and TOUTS obtained by the aforementioned steps 9, 11 and 14 (step 15).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

Figure 7:
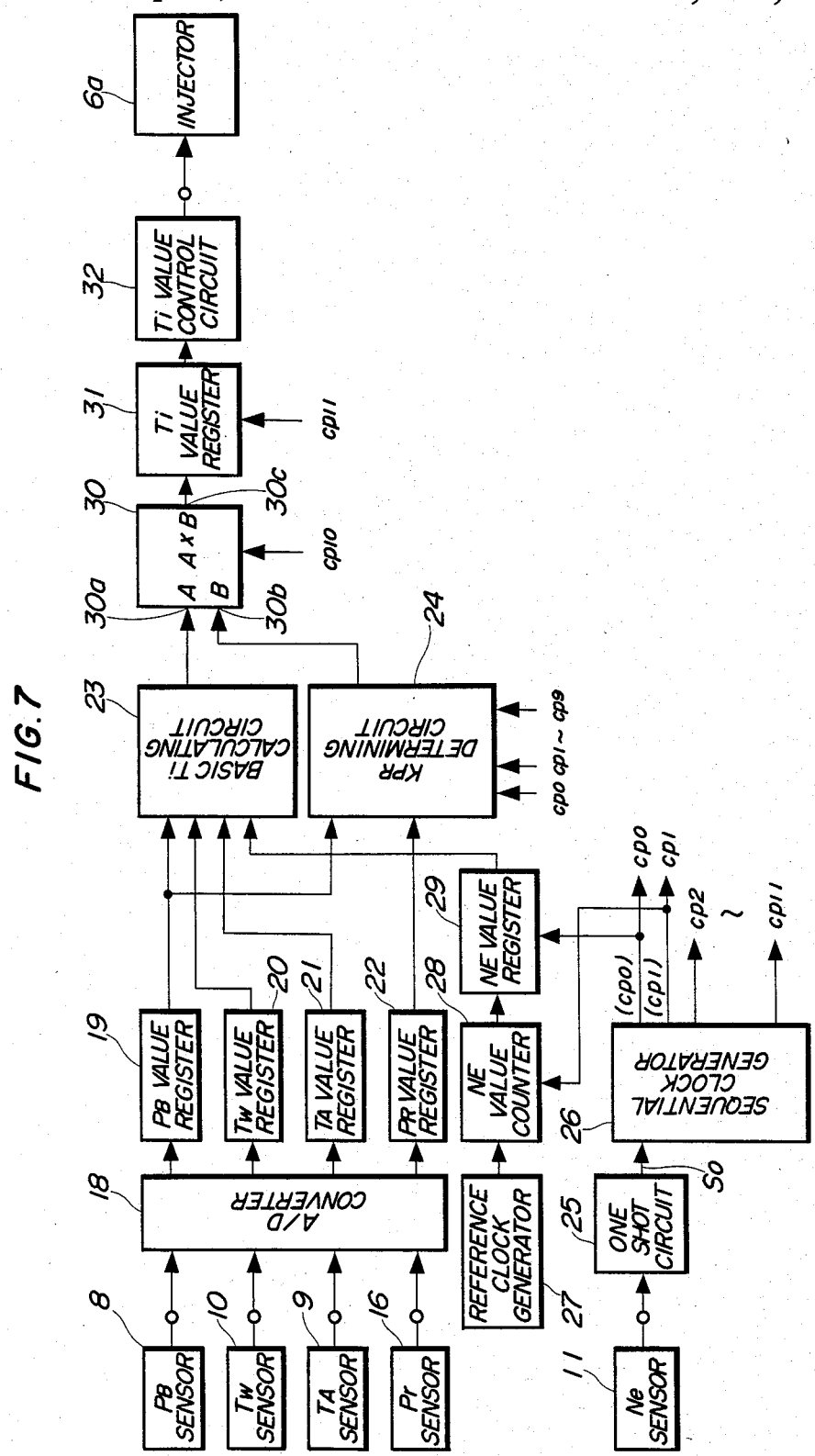
FIG. 7 is a block diagram illustrating the internal arrangement of the ECU, including a circuit for determining the value of a back pressure-dependent correction coefficient KPR.
Figure 8:
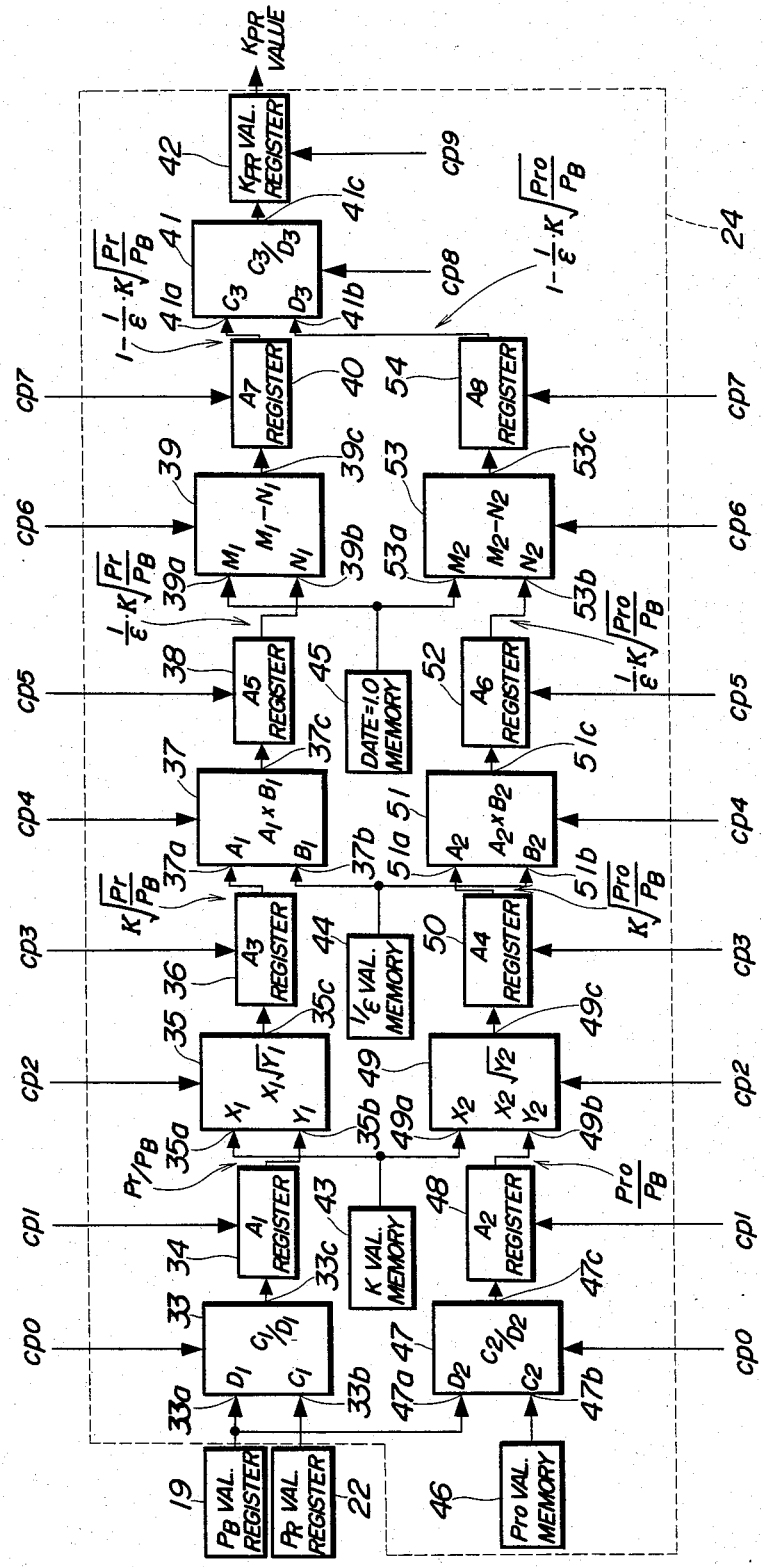
FIG. 8 is a block diagram illustrating in detail the coefficient KPR determining circuit in FIG. 7.
Figure 9:
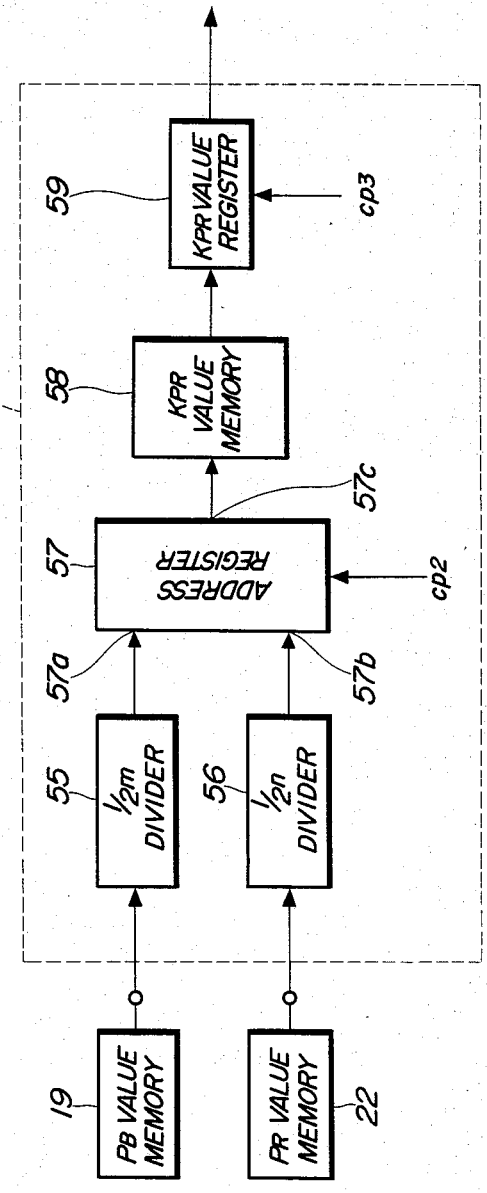
FIG. 9 is a block diagram illustrating another embodiment of the correction coefficient KPR determining circuit, which can be used in place of the circuit of FIG. 8.

FIGS. 7 through 9 illustrate the internal construction of the ECU 5 by way of example, including means for determining the value of the air/fuel ratio correction coefficient KPR, referred to above. Referring first to FIG. 7, there is illustrated a whole circuit arrangement provided in the ECU 5, including a circuit for arithmetically calculating the value of the correction coefficient KPR. The intake pipe absolute pressure PB sensor 8, the engine cooling water temperature TW sensor 10, the intake air temperature TA sensor 9, and the back pressure Pr sensor 16, all appearing in FIG. 1, are connected, respectively, to a PB value register 19, a TW value register 20, a TA value register 21, and a PR value register 22, by way of a group of A/D converters 18. The PB value register 19 has its output connected to a basic Ti value calculating circuit 23 and also to a KPR value determining circuit 24. The TW value register 20 and the TA value register 21 have their respective outputs connected to the basic Ti value calculating circuit 23. the PR value register 22 has its output connected to the KPR value determining circuit 24. The engine rpm Ne sensor 11 is connected to a sequential clock generator 26, by way of a one shot circuit 25, which generator 26 in turn has several output terminals connected to respective ones of an NE value counter 28, an NE value register 29, the above KPR value calculating circuit 24, a multiplier 30, and a Ti value register 31. The NE value counter 28 is connected to a reference clock generator 27 to be supplied with clock pulses therefrom. The clock generator 27, the NE value counter 28, and the NE value register 29 are serially connected in the mentioned order, the NE value register 29 being connected at its output to the basic Ti value calculating circuit 23. The basic Ti value calculating circuit 23 has its output connected to the multiplier 30 at its one input terminal 30a, and the KPR value determining circuit 24 to the same circuit 30 at its other input terminal 30b, respectively. The multiplier 30 has its output terminal 30c connected to a Ti value control circuit 32 through the aforementioned Ti value register 31, which circuit 32 in turn has its output connected to the main injectors or subinjector 6a of the fuel injection device 6 in FIG. 3.

Figures 10, 11:
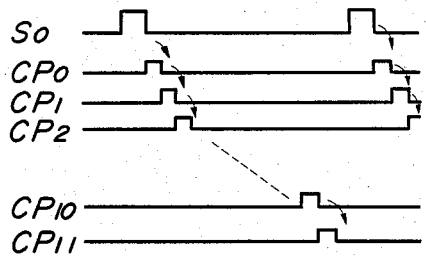
FIG. 10 is a view showing an exhaust pipe absolute pressure-intake pipe absolute pressure map for determining the value of the correction coefficient KPR.
FIG. 11 is a timing chart showing the relationship between a pulse signal So inputted to the sequential clock generator in FIG. 7 and clock pulses generated therefrom.

An output or TDC signal of the engine rpm Ne sensor 11 is supplied to the one shot circuit 25 which forms a shaping circuit in cooperation with its adjacent sequential clock generator 26. Upon application of each pulse of the TDC signal to the one shot circuit 25, it generates an output pulse So and applies same to the sequential clock generator 26 to cause it to generate clock pulses CP0–CP11 in a sequential manner. FIG. 11 shows the manner in which the clock pulses CP0–CP11 are sequentially generated each time a pulse So is applied to the circuit 26. The clock pulse CP0 is applied to the NE value register 29 to cause same to store an immediately preceding count outputted from the NE value counter 28 which permanently counts reference clock pulses generated by the reference clock generator 27. Then, the clock pulse CP1 is applied to the NE value counter 28 to reset the immediately preceding count in the counter 28 to zero. Therefore, the engine rpm Ne is measured in the form of the number of reference clock pulses counted between two adjacent pulses of the TDC signal. The counted reference clock pulse number or measured engine rpm NE is loaded into the above NE value register 29. On the other hand, the clock pulses CP0–CP9 are supplied to the KPR value determining circuit 24, the clock pulse CP10 to the multiplier 30, and the last clock pulse CP11 to the Ti value register 31, respectively.

In a manner parallel with the above operation, output signals of the intake pipe absolute pressure PB sensor 8, the engine cooling water temperature TW sensor 10, the intake-air temperature TA sensor 9, and the back pressure Pr sensor 16 are supplied to the A/D converter group 18 to be converted into respective corresponding digital signals which are in turn loaded into the PB value register 19, the TW value register 20, the TA value register 21, and the PR value register 22, respectively. These values stored in the registers are then supplied to the basic Ti value calculating circuit 23, which in turn performs arithmetic calculation of the basic valve opening period Ti (TOUTM or TOUTS) for the fuel injection valve(s) 6a in accordance with the manner previously described with reference to FIGS. 4 through 6, on the basis of the input data PB, TW, TA and NE supplied from the registers 19, 20, 21 and 29. The calculated Ti value is supplied to the input terminal 30a of the multiplier 30 as an input A.

The KPR value determining circuit 24 determines the value of the back pressure-dependent correction coefficient KPR by arithmetic calculation, for instance, in a manner based upon the aforementioned equation (14), on the basis of input data PB and Pr supplied from the PB value register 19 and the PR value register 22. A manner of calculation by the circuit 24 will be hereinlater described in detail with reference to FIG. 8. The resultant determined value of correction coefficient KPR is supplied to the other input terminal 30b of the multiplier 30 as an input B.

In the multiplier 30, multiplication of the value of the input A or the basic Ti value by the value of the input B or the correction coefficient KPR is carried out in synchronism with inputting of each clock pulse CP10 thereto from the sequential clock generator 26. The resultant calculated value or Ti value compensated for exhaust pipe absolute pressure Pr and intake pipe absolute pressure PB is outputted from the multiplier 30 through its output terminal 30c and loaded into the Ti value register 31. The Ti value register 31 stores the compensated Ti value upon application of each clock pulse CP11 thereto from the sequential generator 26, and applies same to the Ti value control circuit 32. The circuit 32 in turn operates upon the input Ti value data to supply a driving signal to each fuel injection valve 6a to open same for a valve opening period corresponding to the input Ti value.

FIG. 8 illustrates details of the internal construction of KPR value determining circuit 24 in FIG. 7, where arithmetic calculation of the correction coefficient KPR is carried out in a manner based upon the aforementioned equation (14). The PB value register 19 in FIG. 7 has its output connected to a divider 33 at its one input terminal 33a, as well as to another divider 47 at its one input terminal 47a. The PR value register 22 in FIG. 7 has its output connected to the divider 33 at its other input terminal 33b. The divider 33 has its output terminal 33c connected to a root calculating circuit 35 at its one input terminal 35b by way of an A1 register 34, which in turn has its output terminal 35c connected to a multiplier 37 at its one input terminal 37a, by way of an A3 register 36. The multiplier 37 has its output terminal 37c connected to a subtracter 39 at its one input terminal 39b by way of an A5 register 38, which in turn has its output terminal 39c connected to a divider 41 at its one input terminal 41a, through an A7 register 40. The divider 41 has its output terminal 41c connected to the input terminal 30b of the multiplier 30 in FIG. 7 by way of a KPR value register 42. The aforementioned divider 47 has its output terminal 47c connected to a root calculating circuit 49 at its one input terminal 49b through an A2 register 48, which in turn has its output terminal 49c connected to a multiplier 51 at its one input terminal 51a through an A4 register 50. The multiplier 51 has its output terminal 51c connected to a subtracter 53 at its one input terminal 53b, which has its output terminal 53c connected to the other input terminal 41b of the divider 41, through an A8 register 54. A Pro value memory 46 is connected to the other input terminal 47b of the divider 47. A K value memory 43 is connected to the other input terminals 35a and 49a of the root calculating circuits 35 and 49. A $1/\epsilon$ value memory 44 is connected to the other input terminals of the multipliers 37 and 51, and a 1.0 value memory 45 is connected to the other input terminals 39a and 53a of the subtracters 39 and 53.

The KPR value determining circuit 24 constructed above operates as follows: The divider 33 has its input terminal 33a supplied with PB value data from the PB value register 19 in FIG. 7 as an input D1, and its other input terminal 33b with Pr value data from the PR value register 22 in FIG. 7 as an input C1, respectively. The divider 33 supplies a quotient of C1/D1 or Pr/PB obtained by dividing the value of the input C1 by the value of the input D1, to the A1 register 34, upon application of each clock pulse CP0 to the circuit 33. The A1 register 34 in turn replaces its old stored value by the new value C1/D1 each time a clock pulse CP1 is applied thereto, and supplies its newly stored value to the input terminal 35b of the root calculating circuit 35, as an input Y1. The root calculating circuit 35 has its other input terminal 35a supplied with a value of ratio of specific heat $\chi$ of air from the K value register 43, as an input X. The root calculating circuit 35 calculates the X1th root of Y1, i.e. $\chi\sqrt{Pr/PB}$, upon application of each clock pulse CP2 thereto, and applies same to the A3 register 36 through its output terminal 35c. Upon application of each clock pulse CP3 to the A3 register 36, it replaces its old stored value by the new value of $\chi\sqrt{Pr/PB}$ and applies same to the input terminal 37a of the multiplier 37, as an input A1. The multiplier 37 has its other input terminal 37a supplied with a value of $1/\epsilon$ from the $1/\epsilon$ value memory 44, an input B1, so that multiplication of the input A1 by the input B1 is carried out upon application of each clock pulse CP4 to the multiplier 37. The resultant roduct A1×B1, i.e. $1/\epsilon \cdot \chi\sqrt{Pr/PB}$ is supplied to the A5 register 38, through its output terminal 37c. Upon application of each clock pulse CP5 to the A5 register 38, it replaces its old stored value by the new value of the product A1×B1, and supplies same to the subtracter 39 at its input terminal 39b, as an input N1. The subtracter 39 has its other input terminal 39a supplied with a value of 1.0 from the 1.0 value memory 45, as an input M1, so that subtraction of N1 from M1 is calculated, upon application of each clock pulse CP6 to the subtracter 39. The resultant difference or $1-1/\epsilon\cdot\chi\sqrt{Pr/PB}$ is applied to the A7 register 40, through the output terminal 39c of the subtracter 39. The A7 register 40 has its old stored value replaced by the new value of the above difference M1−N1, upon application of each clock pulse CP7 thereto, and supplies same to the divider 41 at its input terminal 41a, as an input C3.

On the other hand, similar calculations to those described above are carried out also in the divider 47, the root calculating circuit 49, the multiplier 51, and the subtracter 53. For instance, at the divider 47, a quotient of Pro/PB is calculated on the basis of the reference exhaust pipe pressure value Pro, e.g. 770 mmHg supplied from the Pro value memory 46 as an input C2, and an actual intake pipe absolute pressure value PB supplied from the PB value register 19, as an input D2. Further, a root value of $\chi\sqrt{Pro/PB}$ is calculated at the root calculating circuit 49, a product of $1/\epsilon\cdot\chi\sqrt{Pro/PB}$ at the multiplier 51, and a difference of $1-1/\epsilon\cdot\chi\sqrt{Pro/PB}$ at the subtracter 53, respectively, in manners similar to those described above. Finally, the divider 41 has its input terminal 41b supplied with the resultant difference of $1-1/\epsilon\cdot\chi\sqrt{Pro/PB}$, as an input D3. At the divider 41, division of the input C3 by the input D3 is carried out to obtain quotient of C3/D3, that is, $$KPR = \frac{1 - (1/\epsilon)(Pr/PB)^{1/\chi}}{1 - (1/\epsilon)(Pro/PB)^{1/\chi}}$$

The above quotient is outputted from the divider 41 through its output terminal 41c and applied to the KPR value register 42. The KPR value register 42 has its old stored value replaced by the new value of C3/D3 or KPR upon application of each clock pulse CP9 thereto, and applies its new stored value to the input terminal 30b of the multiplier 30 in FIG. 7.

FIG. 9 illustrates another embodiment of the KPR value determining circuit 24 in FIG. 7. According to this embodiment, a correction coefficient KPR value is read from a plurality of predetermined values which are previously determined by using the aforegiven equation (14) and stored, in accordance with detected values of exhaust pipe absolute pressure Pr and intake pipe absolute pressure PB. The PB value register 19 in FIG. 7 has its output connected to an address register 57 at its first input terminal 57a, by way of a $1/2^m$ divider 56. The PR value register 22 has its output connected to the same address register 57 at its second input terminal 57b by way of a $1/2^n$ divider 56. The address register 57 has its output terminal 57c connected to the input of a KPR value data memory 58 which in turn has its output connected to the input of a KPR value register 59. This KPR value register 59 has its output connected to the input terminal 30b of the multiplier 30 in FIG. 7.

FIG. 10 illustrates a map for determining the value of correction coefficient KPR in accordance with exhaust pipe absolute pressure Pr and intake pipe absolute pressure PB. The KPA values in the map are previously calculated by the equation (14). Although in the FIG. 10 example, the Pr value and the PB value are each comprised of eight predetermined values, they may each be comprised of another number of such predetermined values. When the actual value Pr or PB lies between adjacent ones of the predetermined Pr or PB values, the KPR value may be determined by means of an interpolation method, to avoid use of a large capacity memory.

A plurality of addresses are stored in the address register 57 in FIG. 9, which correspond to the predetermined values of exhaust pipe absolute pressure Pr and intake pipe absolute pressure PB in the map of FIG. 10, while predetermined values KPRij of correction coefficient KPR are stored in the KPR value data memory 58, which correspond to the above addresses in the register 57.

An output of the PB value register 19 in FIG. 7 is supplied to the $1/2^m$ divider 55 in FIG. 9 to be converted into a corresponding integral number, and then loaded into the address register 57 through its first input terminal 57a. On the other hand, an output of the PR value register 22 is supplied to the $1/2^n$ divider 26 to be converted into a corresponding integral number and loaded into the address register 57 through its second input terminal 27b. An address corresponding to the loaded values Pr and PB is selectively read from the register 57 upon application of each clock pulse CP2 thereto, and supplied to the KPR value data memory 28. At the KPR value memory 58, a value of the correction coefficient KPR is selectively read, which corresponds to the input address, and then loaded into the KPR value register 59. The latter replaces its old stored value by the new KPR value inputted thereto, upon application of each clock pulse CP3 thereto, and the new KPR value is supplied to the input terminal 30b of the multiplier 30 in FIG. 7.

What is claimed is:

1. A method for correcting the air/fuel ratio of an air/fuel mixture being supplied to an internal combustion engine having an exhaust pipe, an intake pipe, and a throttle valve arranged in said intake pipe, comprising: detecting a value of at least one parameter indicative of the operating condition of said engine; determining a value of the air/fuel ratio of said air/fuel mixture in accordance with the detected value of said at least one parameter; detecting a value of absolute pressure in said exhaust pipe; detecting a value of absolute pressure in said intake pipe at a location downstream of said throttle valve; determining a value of a coefficient for correction of said determined value of the air/fuel ratio, as a function of the detected values of said exhaust pipe absolute pressure, said intake pipe absolute pressure, and a predetermined reference value of said exhaust pipe absolute pressure which is available at a predetermined value of atmospheric pressure provided that said engine is not provided with any element which increases said exhaust pipe absolute pressure; and correcting the determined value of the air/fuel ratio by an amount corresponding to the determined value of said correction coefficient.

2. The method as claimed in claim 1, wherein the value of said correction coefficient is determined by the following equation:

$$KPR = \frac{1 - (1/\epsilon)(Pr/PB)^{1/\chi}}{1 - (1/\epsilon)(Pro/PB)^{1/\chi}}$$

where $\epsilon$ represents the compression ratio of said engine, Pr the exhaust pipe absolute pressure, Pro a predetermined reference exhaust pipe absolute pressure, PB the intake pipe absolute pressure, and $\chi$ the ratio of specific heat of air, respectively.

3. The method as claimed in claim 1 or claim 2, wherein said at least one parameter comprises engine rpm and absolute pressure in said intake pipe at a location downstream of said throttle valve.

4. In a fuel supply control system for use with an internal combustion engine having an exhaust pipe, an intake pipe, a throttle valve arranged in said intake pipe, and at least one electromagnetically controlled fuel injection valve arranged for injecting fuel into said intake pipe at a location downstream of said throttle valve and having a valve opening period thereof adapted to determine a quantity of fuel being supplied to said engine, said system including means for determining a basic value of the valve opening period of said fuel injection valve as a function of at least one parameter representing operating conditions of said engine, to thereby control the air/fuel ratio of an air/fuel mixture being supplied to said engine, an air/fuel ratio correcting device comprising: a first pressure sensor for detecting a value of absolute pressure in said exhaust pipe; a second pressure sensor for detecting a value of absolute pressure in said intake pipe at a location downstream of said throttle valve; reference signal generating means for generating a signal indicative of a predetermined reference value of said exhaust pipe absolute pressure which is available at a predetermined value of atmospheric pressure provided that said engine is not provided with any element which increases said exhaust pipe absolute pressure; means for arithmetically calculating a value of a coefficient for correction of the valve opening period of said fuel injection valve as a function of output values of said first and second pressure sensors and an output value of said reference signal generating means; and means for correcting the determined valve opening period of said fuel injection valve by an amount corresponding to the calculated value of said correction coefficient.

5. The air/fuel ratio correcting device as claimed in claim 4, wherein said arithmetically calculating means is adapted to arithmetically calculate the value of said correction coefficient by the following equation:

$$KPR = \frac{1 - (1/\epsilon)(Pr/PB)^{1/\chi}}{1 - (1/\epsilon)(Pro/PB)^{1/\chi}}$$

where $\epsilon$ represents the compression ratio of said engine, Pr the exhaust pipe absolute pressure, Pro a predetermined reference exhaust pipe absolute pressure, PB the intake pipe absolute pressure, and $\chi$ the ratio of specific heat of air, respectively.

6. In a fuel supply control system for use with an internal combustion engine having an exhaust pipe, an intake pipe, a throttle valve arranged in said intake pipe, and at least one electromagnetically controlled fuel injection valve arranged for injecting fuel into said intake pipe at a location downstream of said throttle valve and having a valve opening period thereof adapted to determine a quantity of fuel being supplied to said engine, said system including means for determining a basic value of the valve opening period of said fuel injection valve as a function of at least one parameter representing operating conditions of said engine, to thereby control the air/fuel ratio of an air/fuel mixture being supplied to said engine, an air/fuel ratio correcting device comprising: a first pressure sensor for detecting a value of absolute pressure in said exhaust ice comprising: a first pressure sensor for detecting a value of absolute pressure in said exhaust pipe; a second pressure sensor for detecting a value of absolute pressure in said intake pipe at a location downstream of said throttle valve; reference signal generating means for generating a signal indicative of a predetermined reference value of said exhaust pipe absolute pressure which is available at a predetermined value of atmospheric pressure provided that said engine is not provided with any element which increases said exhaust pipe absolute pressure; means storing a plurality of predetermined values of a coefficient for correction of the valve opening period of said fuel injection valve, said predetermined values being functions of said exhaust pipe absolute pressure, said intake pipe absolute pressure, and said predetermined reference value of said exhaust pipe absolute pressure; means for selectively reading from said storage means a corresponding one of said predetermined correction coefficient values to output values of said first and second pressure sensors, and an output value of said reference signal generating means; and means for correcting the determined value of the valve opening period of said fuel injection valve by an amount corresponding to the read value of said correction coefficient.

7. The air/fuel ratio correcting device as claimed in claim 6, wherein the value of said correction coefficient is determined by the following equation:

$$KPR = \frac{1 - (1/\epsilon)(Pr/PB)^{1/\chi}}{1 - (1/\epsilon)(Pro/PB)^{1/\chi}}$$

where $\epsilon$ represents the compression ratio of said engine, Pr the exhaust pipe absolute pressure, Pro a predetermined reference exhaust pipe absolute pressure, PB the intake pipe absolute pressure, and $\chi$ the ratio of specific heat of air, respectively.

* * * * *

UNITED STATES PATENT AND TRADEMARK OFFICE
CERTIFICATE OF CORRECTION

PATENT NO. : 4,509,485
DATED : April 9, 1985
INVENTOR(S) : Shumpei Hasegawa

It is certified that error appears in the above-identified patent and that said Letters Patent are hereby corrected as shown below:

Column 16, lines 13-15 delete "a first pressure sensor for detecting a value of absolute pressure in said exhaust ice comprising".

Signed and Sealed this

Twenty-fifth Day of August, 1987

Attest:

DONALD J. QUIGG

Attesting Officer

Commissioner of Patents and Trademarks